Dec. 14, 1954     S. B. PREVO     2,696,817
PROSTHETIC ELBOW JOINT
Filed April 30, 1952
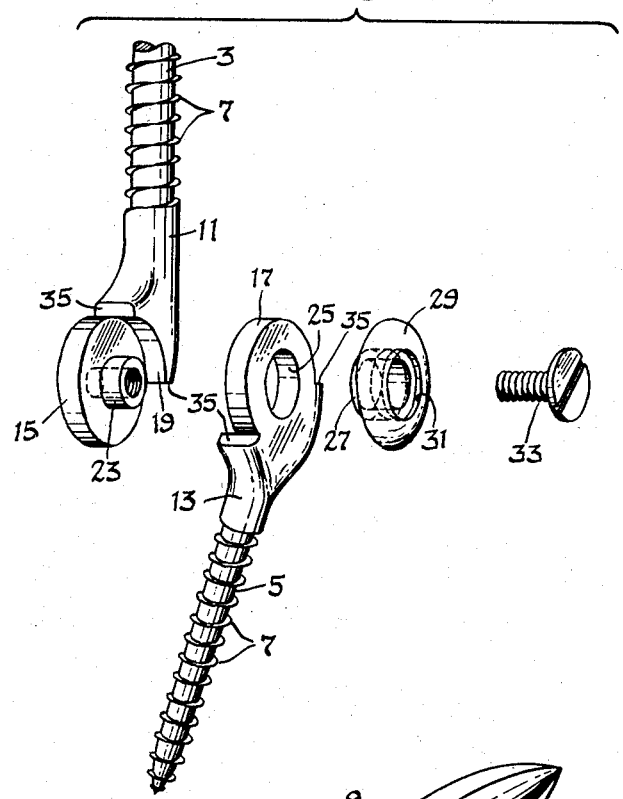
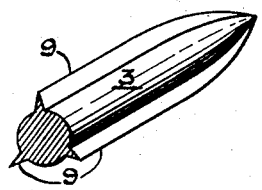
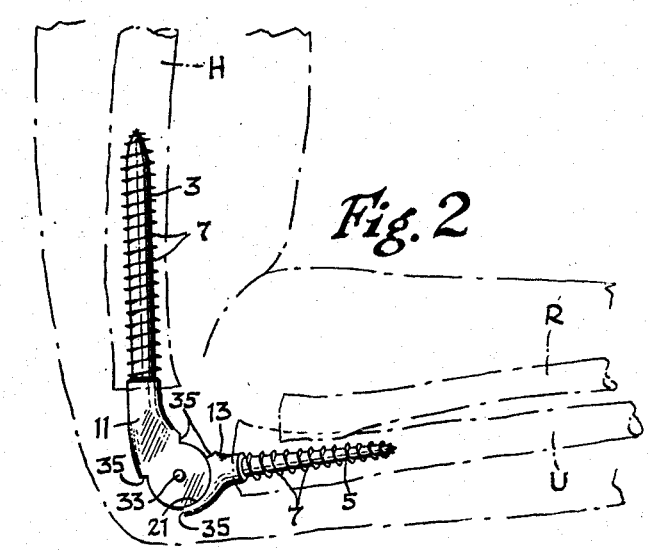
INVENTOR:
Samuel B. Prevo
BY
*Ralph F. Stanly,*
ATTORNEY.

United States Patent Office 2,696,817
Patented Dec. 14, 1954

2,696,817

PROSTHETIC ELBOW JOINT

Samuel B. Prevo, Nashville, Tenn.

Application April 30, 1952, Serial No. 285,278

14 Claims. (Cl. 128—92)

This invention relates to a prosthetic elbow joint. More specifically it relates to a prosthetic elbow joint comprising two finned shafts separately insertable into the marrow cavities of the humerus and the ulna, and then pivotally connectable by a quickly but firmly attachable trunnion.

This invention contemplates providing a prosthetic elbow which does not require any moving contact between bone and foreign bodies, has a low-friction bearing, and is very stable against compression, tension, and lateral forces.

It is accordingly an object of this invention to provide an elbow joint that is easily installable as separate easily connectable sections.

It is another object to produce an elbow joint requiring a minimum incision for installation.

It is a further object to design an elbow joint connectable to the bone ends by finned bone-cavity-fitting shafts.

It is a still further object to provide an elbow joint that is tensionally as well as compressionally and laterally stable.

These and other objects and advantages of the invention will become apparent as the following detailed description proceeds.

In the drawings illustrating preferred embodiments of the invention, and in which like reference characters designate like parts thruout the several views:

Fig. 1 is a front elevational view of a right elbow joint in its extended-arm position (its flexed position, the arm outline, and the bones involved, being shown in phantom).

Fig. 2 is a side elevational view of the elbow joint of Fig. 1 with the forearm at right angles to the upper arm.

Fig. 3 is an exploded perspective view of the device of Figs. 1 and 2.

Fig. 4 is a partial perspective of a modified form of bone-cavity-fitting shaft.

With reference now to the drawings, the letter H represents the humerus which has been cut off at 1 to remove the diseased or trauma-damaged joint end. The ends of the ulna U and the radius R have been similarly cut away at 2. The marrow has been removed from the adjacent ends of the humerus and the ulna, preferably by using drills and/or reamers designed to remove most of the soft marrow and to leave tubular bores just large enough to closely surround the solid portions of the finned shafts of the elbow joint.

The prosthetic elbow joint of this invention comprises a shaft 3 and a somewhat smaller tapered shaft 5 of sizes to fit the marrow channels of the humerus and the ulna when bored to remove most of the soft marrow. Each shaft is provided with threads 7 (in the species of Figs. 1–3) or with longitudinally extending fins 9 (in the species of Fig. 4). These threads or fins cut mating threads or grooves in the walls of the bone cavity which improve the firmness of the adhesion between the shafts and the bone cavity. The helical fins (screw threads) would best improve the resistance to axial displacement, while the longitudinal fins would best prevent rotational displacement. However, each is superior to a smooth shaft for both effects.

Due to the separability of the joint, only a relatively small incision in the elbow zone is necessary. After the bone cavities are bored, the shafts are either screwed (species of Figs. 1–3) or driven (species of Fig. 4) into the bores to the desired depth. Then the shafts are connected by the hinge elements best disclosed in Fig. 3.

The hinge structure, as shown in Fig. 3, comprises enlarged heads 11 and 13 on the adjacent ends of the shafts 3 and 5, respectively. The head 11 curves forwardly (Fig. 2) to place the axis of the hinge forwardly of the center-line of the humerus by an amount approximating that found in the natural joint. The head on the shaft 5 is bent laterally at an angle of about 15° from the axis of the shaft (approximating the anatomical angle between the humerus and the forearm). A left elbow (not shown) would be a mirror-image of the right elbow disclosed.

Both heads 11 and 13 respectively terminate in accurately machined circular bearing-disks 15 and 17, and in arc-shaped seats 19 and 21, for mating engagement with each other, as shown.

The disk 15 carries a co-axial post 23, preferably formed integrally therewith and provided with a threaded axial bore. Disk 17 has an accurately machined and polished bearing bore 25 which is larger than the post 23 by an amount sufficient to permit the trunnion sleeve 27 to snugly fit between said post and bearing bore. Trunnion sleeve 27 is very slightly longer than the thickness of disk 17 and is provided with a flange 29 for overlying the outer face of disk 17. Flange 29 is centrally recessed at 31 to receive the head of the screw 33, as shown in Fig. 1. Disk 17 thus rotates around trunnion sleeve 27 and between the end or thrust-bearing surfaces of the disk 15 and the flange 29.

The ends of the arc-shaped portions of the heads form stop abutments 35 which limit pivotal movement of the joint elements to a range approximating that of a natural joint.

All parts of the device should be made of physiologically inert substances. If metal is employed the same alloy should be used for all metallic parts to prevent galvanic reactions. Due to the large bearing areas, the body-fluid lubrication of the bearing surfaces is entirely satisfactory.

While I have disclosed certain preferred embodiments of the invention, it is to be understood that many changes can be made in the size, shape, arrangement and composition of the parts without departing from the spirit of the invention as defined by the subjoined claims.

Having thus described my invention, what I claim as new and desire to secure by Letters Patent of the United States is:

1. A prosthetic elbow joint, comprising: a rigid shaft of a size and shape for snugly fitting the tubular cavity formed by removing the soft marrow from the lower end of the humerus, said shaft terminating in an enlarged head portion having a large-area bearing member lying generally forwardly of the axis of said shaft and connected to said shaft by a curved extension thereof; a second rigid shaft of a size and shape for snugly fitting a similar cavity in the ulna, said second shaft terminating in an angularly offset enlarged head having a large-area bearing member for mating with the bearing member of said first-mentioned shaft; and mechanical means joining and firmly holding said bearing members in mating engagement after said shafts are separately inserted into their respective bone cavities, said mechanical means and said bearing members positively holding said shafts against relative movements other than rotation about the axis of said bearing members.

2. A prosthetic elbow joint according to claim 1 and in which the axis of rotation of said bearing members is substantially at right angles to the axis of said first-mentioned shaft.

3. A prosthetic elbow joint according to claim 2 and in which said axes are separated at their nearest points by a distance of the order of the diameter of said first-mentioned shaft.

4. A prosthetic elbow joint according to claim 1 and in which the angular offset between second shaft and its enlarged head produces an angle of the order of 75° between the axis of rotation of said bearing members and the axis of said second shaft.

5. A prosthetic elbow joint according to claim 1 and in which said shafts, heads, and bearing members, are formed of physiologically inert substances.

6. A prosthetic elbow joint according to claim 5 and in which at least some of said substances is a physiologically inert alloy.

7. A prosthetic elbow joint according to claim 1 and in which said shafts include outwardly extending bone-penetrating fin means for improving the adherence between said shafts and the surrounding bone.

8. A prosthetic elbow joint according to claim 7 and in which said fin means comprise helical threads.

9. A prosthetic elbow joint according to claim 1 and in which said shafts include radially and longitudinally extending sharp-edged fins for improving the adherence between said shafts and the surrounding bone.

10. A prosthetic elbow joint according to claim 1 and in which said bearing members include disk-shaped portions having a large cylindrical bore therethru, and a tubular post passing thru said bore to form the trunnion part of the bearing.

11. A prosthetic elbow joint according to claim 10 and in which each of said enlarged heads has an arc-shaped seat mating with the edge of the disk-shaped portion of the head of the other of said shafts, whereby the shear pressures on said trunnion part are lessened when said joint is under compression.

12. A prosthetic elbow joint according to claim 11 and in which said tubular post is separable from both of said disk-shaped portions, has a flanged head for overlying the outer face of one of said portions, and has an axial bore therethru, and in which the other of said portions has a lug attached thereto for entering said bore, said lug having a threaded bore therein and a screw cooperative therewith for joining all of said parts into an operative hinge structure.

13. A prosthetic elbow joint according ot claim 1 and in which said bearing members include stop abutments for limiting the pivotal movement of said joint to a range approaching that of a natural elbow joint.

14. A prosthetic elbow joint, comprising: a rigid shaft of a size and shape for snugly fitting the tubular cavity formed by removing the soft marrow from the lower end of the humerus, said shaft terminating in an enlarged head portion having a large-area bearing member formed therein; a second rigid shaft of a size and shape for snugly fitting a similar cavity in the ulna, said second shaft terminating in an enlarged head having a large-area bearing member for mating with the bearing member of said first-mentioned shaft; mechanical means joining and firmly holding said bearing members in mating engagement after said shafts are separately inserted into their respective bone cavities, said mechanical means and bearing members holding said shafts against relative movements other than rotation about the axis of said bearing members.

References Cited in the file of this patent

UNITED STATES PATENTS

| Number | Name | Date |
| --- | --- | --- |
| 489,258 | Marks | Jan. 3, 1893 |

OTHER REFERENCES

The Journal of Bone and Joint Surgery for July 1951, advertising page 4.

The Journal of Bone and Joint Surgery for January 1952, advertising page 4.

La Presse Medicale for May 3, 1947, page 302.

Copies of these publications in Div. 55.